(12) United States Patent
Cheriton (10) Patent No.: US 9,805,088 B2
(45) Date of Patent: *Oct. 31, 2017

(54) CONSTRAINT-BASED CONSISTENCY WITH SNAPSHOT ISOLATION

(71) Applicant: OptumSoft, Inc., Menlo Park, CA (US)

(72) Inventor: David R. Cheriton, Palo Alto, CA (US)

(73) Assignee: OptumSoft, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/067,737

(22) Filed: Mar. 11, 2016

(65) Prior Publication Data

US 2016/0292212 A1 Oct. 6, 2016

Related U.S. Application Data

(63) Continuation of application No. 13/926,186, filed on Jun. 25, 2013, now Pat. No. 9,317,549.

(51) Int. Cl.
*G06F 17/30* (2006.01)

(52) U.S. Cl.
CPC .. *G06F 17/30371* (2013.01); *G06F 17/30353* (2013.01); *G06F 17/30377* (2013.01); *G06F 17/30575* (2013.01)

(58) Field of Classification Search
USPC ......................................... 707/639, 690, 703
See application file for complete search history.

(56) References Cited

U.S. PATENT DOCUMENTS

| | | | | |
|---|---|---|---|---|
| 6,275,863 B1* | 8/2001 | Leff | .................. | G06F 17/30356 707/999.201 |
| 6,618,851 B1* | 9/2003 | Zundel | .................... | G06F 17/50 711/156 |
| 7,653,665 B1* | 1/2010 | Stefani | .............. | G06F 17/30362 707/609 |
| 8,402,227 B2 | 3/2013 | Moir | | |
| 8,676,851 B1* | 3/2014 | Nesbit | ............... | G06F 17/30171 707/791 |
| 8,762,333 B2 | 6/2014 | McCline | | |
| 8,935,205 B2 | 1/2015 | Hildenbrand | | |
| 2005/0021567 A1* | 1/2005 | Holenstein | ........... | G06Q 10/087 |
| 2006/0219772 A1* | 10/2006 | Bernstein | .......... | G06F 17/30348 235/379 |
| 2010/0114841 A1* | 5/2010 | Holenstein | ........ | G06F 17/30306 707/690 |
| 2011/0153566 A1* | 6/2011 | Larson | .............. | G06F 17/30356 707/638 |
| 2011/0191297 A1* | 8/2011 | Beck | ................... | G06F 11/2064 707/639 |
| 2011/0246725 A1* | 10/2011 | Moir | ..................... | G06F 11/141 711/147 |

(Continued)

*Primary Examiner* — Cam-Linh Nguyen (74) *Attorney, Agent, or Firm* — Van Pelt, Yi & James LLP (57) ABSTRACT

Efficient processing of concurrent atomic transactions is provided by identifying the constraints that need to be satisfied for correct application behavior. With these constraints identified, commit processing for a transaction can then refer to the constraints to see if committing the current transaction causes a problem with the constraints. If there is a conflict with the constraints, the transaction aborts. If there is no conflict with the constraints, the transaction commits.

25 Claims, 5 Drawing Sheets

Time

(56) References Cited

U.S. PATENT DOCUMENTS

| | | | | |
|---|---|---|---|---|
| 2012/0136839 A1* | 5/2012 | Eberlein | ............ | G06F 17/30351 707/690 |
| 2012/0150802 A1* | 6/2012 | Popov | ................. | G06F 11/1487 707/635 |
| 2012/0166407 A1* | 6/2012 | Lee | .................... | G06F 17/30371 707/703 |
| 2012/0259863 A1* | 10/2012 | Bodwin | .............. | G06F 17/3023 707/747 |
| 2014/0337303 A1* | 11/2014 | Little | ................ | G06F 17/30371 707/703 |

* cited by examiner

FIG. 3 transactions:
    T1) balance1 −= payment and balance2 += payment
    T2) balance1 += rate1 * balance1 (interest)
    T3) balance2 += rate2 * balance2 (interest)

assert constraint:
    C1) balance1 >= 0
    C2) balance2 >= 0 update constraints:
    C3) rate1 = 0 if balance1 < 1000, rate1 = 0.001 if balance1 >= 1000
    C4) rate2 = 0 if balance2 < 1000, rate2 = 0.001 if balance2 >= 1000

CONSTRAINT-BASED CONSISTENCY WITH SNAPSHOT ISOLATION

CROSS REFERENCE TO OTHER APPLICATIONS

This application is a continuation of co-pending U.S. patent application Ser. No. 13/926,186, entitled CONSTRAINT-BASED CONSISTENCY WITH SNAPSHOT ISOLATION filed Jun. 25, 2013 which is incorporated herein by reference for all purposes.

FIELD OF THE INVENTION

This application relates to transaction processing.

BACKGROUND

Atomic transactions are often used to simplify concurrent and fault-tolerant programming. A transaction is atomic if it is indivisible, such that an attempt to perform the transaction can have only two possible outcomes: 1) either all parts of the transaction occur (transaction commits), or 2) no parts of the transaction occur (transaction aborts). Thus, for an atomic transaction, it is impossible for partial execution of the transaction to occur. For example, if a transaction is a transfer of funds from one account to another account, it is highly desirable is for this transaction to be atomic, to avoid the possibility of a credit being applied to one account without a corresponding debit in the other account (or vice versa). Similar advantages accrue to atomic transactions in more general programming situations.

One can identify two fundamental approaches for providing atomic transactions: 1) in-place update and 2) shadow copy. The first is normally implemented by locking to prevent concurrent updates as well as an undo log, to be able to undo changes in the case of transaction abort. It can also be implemented optimistically, instead of using locks, by aborting the transaction if another transaction writes data that this transaction is writing (a so-called write-write conflict) or writes data this transaction is reading (a so-called read-write conflict).

Historically, in-place update has been favored because of the benefits of maintaining the disk layout, given that most transactional data has been disk-based until recently. However, read-locking is a significant overhead, given the preponderance of reads over writes in many applications. Moreover, read-locking data means updates to the locked data are delayed, which really means it ends up being potentially inconsistent with the real world, if the corresponding real world values change during the time it is locked. In some sense, this means its focus on achieving internal consistency can lead to inconsistency with the external environment. The optimistic form of in-place update can suffer from excessive abort rate, given the prevalence of read-write conflicts.

With the move to in-memory databases, the shadow copy approach becomes more attractive than before. Here, an updating transaction makes a copy of the data to be updated, makes the modification and then atomically updates the root reference (or pointer) to this data to refer to the new (previously shadow) copy. Taking this approach further, a transaction can execute from snapshots (i.e. immutable copies) of even the data that it is just reading. This approach is referred to as snapshot isolation (SI). This approach provides most of the properties of conventional serialized transactions with the additional significant benefit of not suffering from the read-write conflicts of the in-place update transactions, which can either incur significant locking overhead or else increase the abort rate in the case of an optimistic implementation.

The shadow copy can be attractive in a distributed implementation because there it is often necessary to duplicate data at a process performing the transaction, thereby providing a copy or snapshot of the data to provide efficient local access. In this case, the copy overhead of SI is effectively eliminated by the access savings this copy provides for local processing, or conversely the creation of the local copy effectively has already paid the cost of a snapshot as required by the SI transaction mechanism. This local copy can also reduce a process's exposure to the failure and restart of a process containing the primary copy of the state because it can continue to operate with its local snapshot.

Unfortunately, SI does not provide sequential consistency (or serializability as it is described in the database world) in the sense that all executions produce the same results as if executed in some sequential order. The compromising behavior arises because of the so-called write skew problem. This problem can be illustrated by considering a simple assert constraint that a transactional application is expected to maintain. For example, consider the assert constraint:

$$39 > b+c;$$

where separate transactions Tb and Tc can update b and c, respectively. If b and c are initially 10, Tb could update b to 20, viewing a snapshot of c as 10, whereas Tc could update c to 20, similarly viewing a snapshot of b as 10. These two transactions can both commit concurrently in the SI model because there is no write-write conflict, yet doing so causes the constraint to be violated.

Various solutions to this problem have been proposed, including ensuring strict serializability of SI transactions, but these lead to excessive overhead, either on the transaction processing itself or by increasing the abort rate of transactions far above that strictly necessary.

What is needed is a means of ensuring correct application behavior while maintaining application and implementation benefits of SI transactions.

SUMMARY

The present approach is based on identifying the constraints that need to be satisfied for correct application behavior. With these constraints identified, commit processing for a transaction can then refer to the constraints and to concurrent updates to see if committing the current transaction causes a problem with the constraints. If there is a conflict with the constraints, the transaction aborts. If there is no conflict with the constraints, the transaction commits.

In comparison with conventional snapshot isolation, the present approach provides superior semantics because it addresses the write skew problem of conventional snapshot isolation.

In comparison with conventional fixes to the write skew problem of SI (e.g., serializable SI), the present approach can provide greater efficiency (e.g., reduced transaction overhead and/or fewer unnecessary transaction aborts). For example, many apparent write-write conflicts can be resolved without aborting a transaction if the requirements on the data are expressed as constraints that can be checked as part of commit processing.

DETAILED DESCRIPTION

Introduction

We provide correct application behavior with snapshot isolation (SI) transactions by:
1) explicitly specifying constraints on the underlying data model;
2) designing application processing be correct if the data model maintains these constraints; and
3) checking the constraints as part of transaction commit processing to ensure that each constraint is maintained by the transaction, or else aborting the transaction if that is not achieved.

If all such constraints are explicitly specified, the infrastructure can ensure that a transaction that violates such a constraint is aborted.

We argue that an application can be designed to operate correctly if the required constraints on its data model are maintained, as follows. First, each application transaction is realized as a sequence of instructions that read and write the application state, i.e., its data model. In all models of transactions, each application transaction executes independently and concurrently except for its interaction through this data model. This application processing makes certain assumptions about the data model for its correct execution. These assumptions can be captured in terms of constraints, statements that are to be true of the data model during the execution of an application transaction. Thus, if an application is correct procedurally relative to these constraints, and the data model constraints are true during the execution of each transaction, the application executes correctly.

The conventional approach of requiring serializability does not, by itself, ensure that the application-specific constraints hold. It is simply a (heavy-handed) way of ensuring that, if the imperative code of transactions preserve the constraints when executed as serial transactions, then this code also preserves the constraints when executed concurrently by multiple transactions, because the execution is serializable, i.e. equivalent to serial execution.

In contrast, in the present work the constraints are explicitly stated and then constraint-specific means are employed to ensure that they hold, rather than imposing this generic ordering requirement (which often amounts to an overkill solution to the problem of write skew).

In some cases, the input source code includes a specification of the constraints. In such cases, corresponding constraint checking code can readily be generated automatically. If the input source code does not include an explicit specification of its constraints, automatic generation of corresponding constraint check code may be possible via automated program analysis. However, in practice, it is likely that the user will need to provide the constraint checking code for input source code that does not have explicit constraints.

Ensuring Data Model Constraints with SI Transactions

The feasibility of ensuring the constraints hold using SI can demonstrated by considering the conventional solution to write skew.

The conventional solution effectively materializes each constraint as a variable that is updated by any transaction that updates a variable in this constraint. For example, using the earlier example, there would be a variable, say, with the constructed name "constraint-(39>b+c)" that is incremented as part of updating b or c. Consequently, any two concurrent transactions affecting the same constraint would have a write-write conflict and at least one of them would be aborted by the SI transaction mechanism. Thus, it is feasible for the transaction mechanism to automatically ensure these constraints hold during each transaction by this construction.

Note that, in many cases, this approach leads to unnecessary aborts. For instance, continuing our earlier example, if both a and b are updated concurrently yet their sum is still less than 39, one of the transactions is unnecessarily aborted because of the write-write conflict on the constraint variable even though committing both would still preserve the constraint. Moreover, in the worst case, the write-set of these SI transactions could be expanded so that all transactions have an overlapping write set, forcing a sequential execution of these transactions. In effect, this construct expands the write set to compensate for the lack of detection of read-write conflicts.

The present approach thus provides a method of committing transactions that allows greater concurrency and fewer aborts based on the actual semantics of the constraints (as opposed to declaring write-write conflicts in all cases).

The basic idea is to have knowledge of these constraints available at commit time, to identify any conflicts at the time, attempt to resolve these conflicts, and only abort if these conflicts cannot be resolved, assuming the transaction would not be aborted for other reasons, such as a resource limitation.

Figure 1:
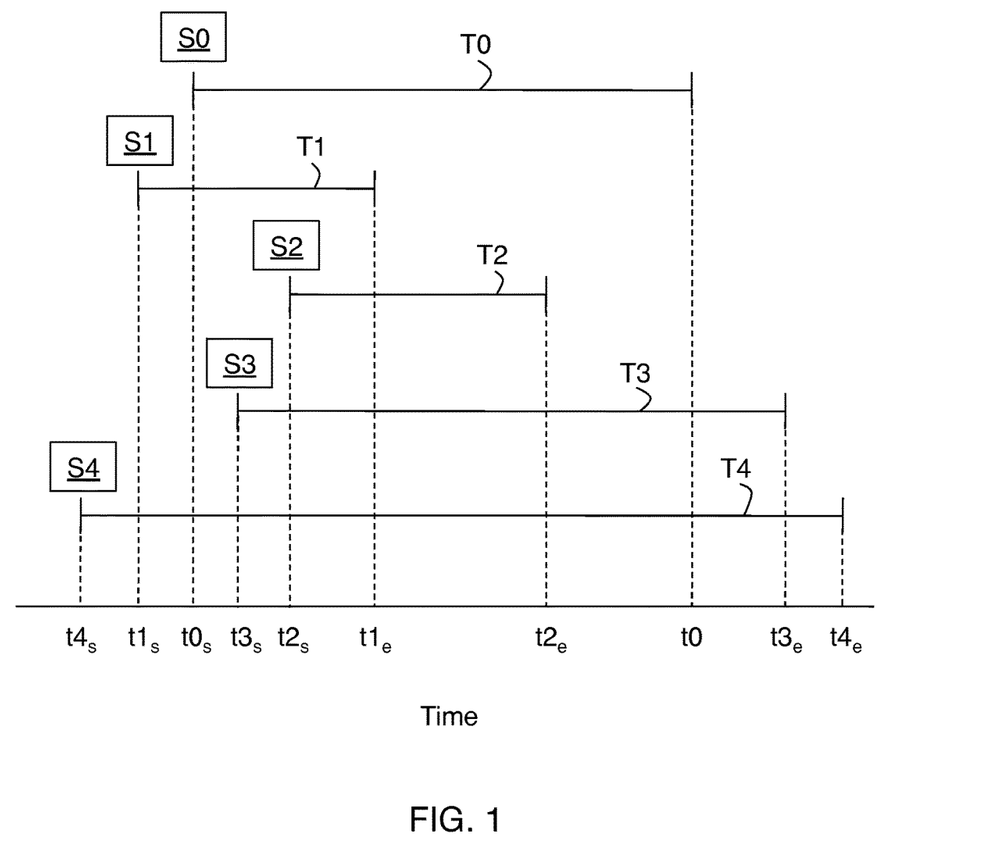
FIG. 1 shows an illustrative time line of several transactions.

Before elaborating further on this approach, we first clarify some terminology. A concurrent transaction is one that committed to the data model after the start time of the current transaction and before the target commit time of this transaction. A concurrent update is one performed by such a concurrent transaction. FIG. 1 provides some examples to illustrate this terminology. Here T0 is the current transaction, shown on a time line. Transactions T1 and T2 are concurrent with T0, while transactions T3 and T4 are not concurrent with T0. Note that the definition of concurrent is relative to which transaction is designated as the current transaction. For example, if T2 is regarded as being the current transaction, then T0 is not concurrent with T2.

More specifically, current transaction T0 has a start time $t0_s$ and a current target commit time $t0_e$. Similarly, transactions T1, T2, T3, and T4 have corresponding start times $t1_s$, $t2_s$, $t3_s$ and $t4_s$ and have corresponding end times $t1_e$, $t2_e$, $t3_e$ and $t4_e$ (at which the transactions either commit or abort). T1 and T2 are concurrent with current transaction T0 because $t0_s < t1_e < t0_e$ and $t0_s < t2_e < t0_e$. Thus, $t1_e$ and $t2_e$ are intermediate times after the current start time $(tc_s)$ and before the current target commit time $(tc_e)$ An exemplary transaction processing method includes the following steps:
1) Providing a set of constraints relating to data in the data model.
2) Performing at least two transactions, where each of the transactions has a corresponding start time, and relies on a corresponding snapshot of part or all of the data model as of the start time. On FIG. 1, these snapshots are labeled as S0, S1, S2, S3, and S4, corresponding to transactions T0, T1, T2, T3 and T4 respectively.

3) For a current transaction and one or more concurrent transactions as defined above, performing a commit processing check that automatically determines whether the current transaction can be committed consistently with the set of constraints from at least a) the snapshot of the current transaction and b) changes to the data model made by the concurrent transactions.

4) Automatically committing the current transaction if it can be made consistently with the set of constraints. and 5) Automatically aborting the current transaction if it cannot be made consistently with the set of constraints. Here steps 4 and 5 rely on the results of the commit processing check of step 3.

Assert Constraints and Read-Write Sets

An "assert" constraint checks that a given condition is true and if not, forces the abort of the transaction.

In this approach, each assert constraint is checked against other concurrent updates, aborting the current transaction if the assert constraint is violated using the current values, i.e. after these updates, and those updated in the current transaction. The read set for an assert constraint is the set of variables that need to be read to evaluate the constraint expression, i.e. determine if it is true. If the current transaction has written at least one variable (X) that is specified as part of the constraint, the checking then needs to determine if any concurrent transaction has changed any of the other variables associated with the constraint. This could be regarded as a read-write conflict check. If one or more such variables have been modified by a concurrent transaction, the constraint check needs to re-evaluate the constraint with those newly committed values as well as its updated but not committed value of X to verify that the constraint still holds.

Figure 2:
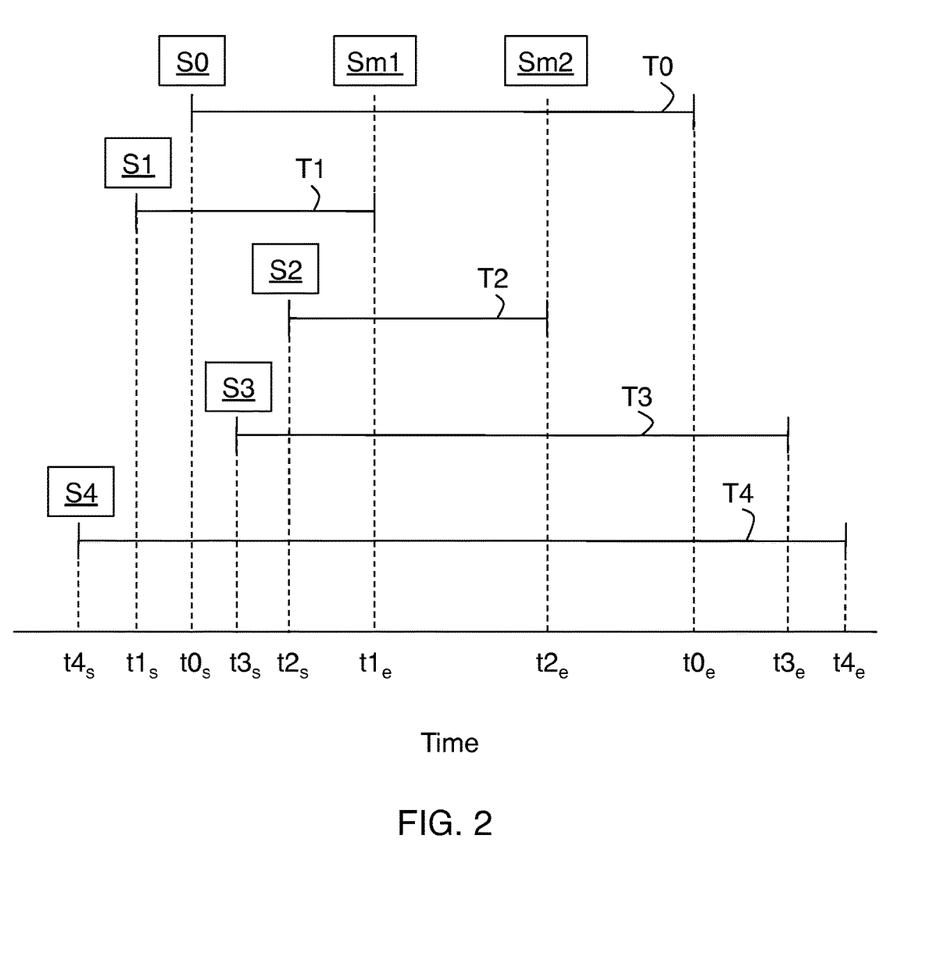
FIG. 2 shows an example of updating the snapshot of the current transaction according to concurrent updates to provide merged snapshots.

In effect, one can view that the concurrent updates are applied to the current transaction's snapshot before this snapshot is committed to generate a merged snapshot. The assert constraints are checked against this merged snapshot of the data model state. FIG. 2 shows an example of this. Here the concurrent update of transaction T1 is applied to the initial snapshot S0 to generate a first merged snapshot Sm1 (which could replace the initial snapshot S0). Later on, the concurrent update of transaction T2 is applied to merged snapshot Sm1 to generate a second merged snapshot Sm2 (which could replace the earlier merged snapshot Sm1). The commit processing check for current transaction T0 can refer to snapshot Sm2 and thereby include the effects of the concurrent updates from transactions T1 and T2. The commit processing check can include re-evaluation of assert constraints using the merged snapshot. If several merged snapshots were generated, the most recent one is employed. The example of FIG. 2 shows separate merged snapshots for clarity of illustration. Alternatively, a single merged snapshot is generated at the time of commit processing that includes the effects of all concurrent updates to variables in the read set determined from the constraints as above. For either alternative, such merged snapshots account for committed changes due to concurrent transactions by updating an earlier snapshot, while not exposing the current transaction to uncommitted changes by concurrent transactions.

Figure 3:
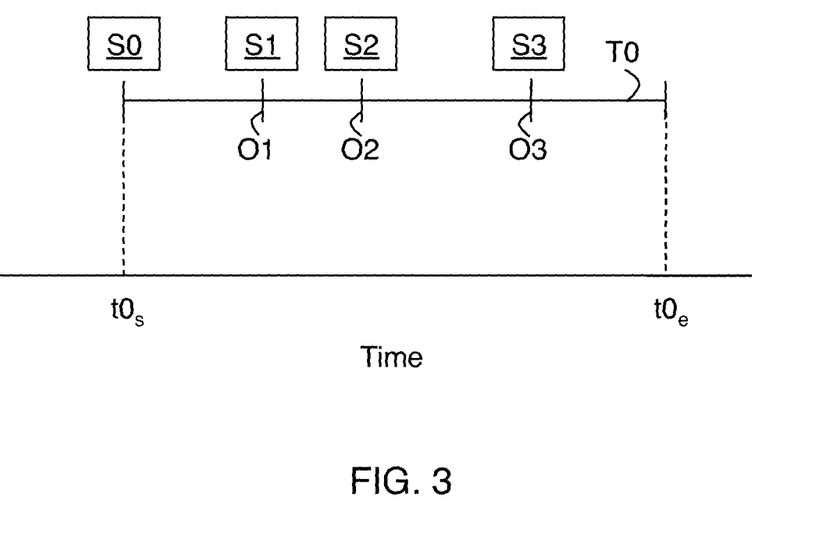
FIG. 3 shows an example of updating a snapshot according to operations performed by the current transaction.

FIG. 3 shows a variation on this theme, where current transaction T0 updates its snapshot according to operations it performs to provide an updated snapshot for the commit processing check. In this example, operations O1, O2, and O3 are applied in sequence to initial snapshot S0 by current transaction T0 to provide updated snapshots S1, S2, and S3 respectively. The commit processing check can refer to the updated snapshot S3 to determine whether or not to commit current transaction T0. If T0 is aborted, the changes made in updated snapshots S1, S2, and S3 never get committed to the main data model, thereby preserving the desired property of atomic transactions. The example of FIG. 3 shows separate updated snapshots for clarity of illustration. Alternatively, a single updated snapshot is generated at the time of commit processing that includes the effects of all operations of the current transaction.

The concurrent updates can be determined from the redo log, as is conventional practice.

In an embodiment, concurrent updates can be determined by comparing the current transactions snapshot to the current committed data model state, with the differences, excluding those caused by updates in the current transaction, indicating the concurrent updates.

In an embodiment, concurrent updates can be determined by comparing the current committed data model state to an unmodified snapshot of the committed state as of the start time of current transaction with the differences indicating the concurrent updates.

In an embodiment, concurrent potentially conflicting updates can be detected by materializing and updating a variable per constraint, as described earlier, but using the indication of a write-write conflict on such a constraint variable to trigger constraint resolution processing as above rather than immediately aborting the current transaction.

With the above approach, it is possible for two concurrent transactions to update two attributes affecting the same constraint and still commit. For example, continuing the earlier example, if a transaction Tb updating b runs concurrently with a current transaction Tc updating c, on commit processing of Tc, the concurrent update of b is detected triggering the re-evaluation of the constraint. If the updated values of b and c are still less than the upper bound 39, the current transaction can commit, and otherwise it is aborted. Thus, a transaction is only aborted by an assert constraint in this approach if it is logically necessary to do so.

In an embodiment, the transaction mechanism can select this approach of re-evaluating constraints for some constraints while using the conventional "constraint variable" approach for others, for instance, if a constraint was deemed to expensive or difficult for the commit processing to perform. In the expected case, most constraints are relatively simple. Thus, an embodiment that only applies this constraint analysis approach to simple constraints and resorts to the conventional construct of a "constraint variable" otherwise should provide significant performance improvement over purely using the conventional approach while minimizing the development complexity.

Update Constraints

Another category of constraints are "update constraints" in which the value of some attribute is determined by the constraint and thus updated when the parameter values of the constraint are changed. An example of an update constraint is an "equality constraint" in which the determined attribute is specified as being equal to some expression. For example:

$$a1 = a0 + 1;$$

means that a1 is constrained to be equal to the value of a0 plus 1. With an update constraint, the implementation causes the determined attribute, namely a1 in this case, to be updated when an argument to the constraint is changed, namely a0 in this case.

An implementation of update constraints is described in U.S. patent application Ser. No. 12/154,399, filed May 21, 2008, entitled "Notification-based constraint set translation to imperative execution", hereby incorporated by reference in its entirety, and hereinafter referred to as OTS-102. In contrast, a conventional SQL integrity constraint, such as an assert, simply checks if the associated expression holds during the commit of a transaction, and aborts the transaction if not.

Figure 4A:
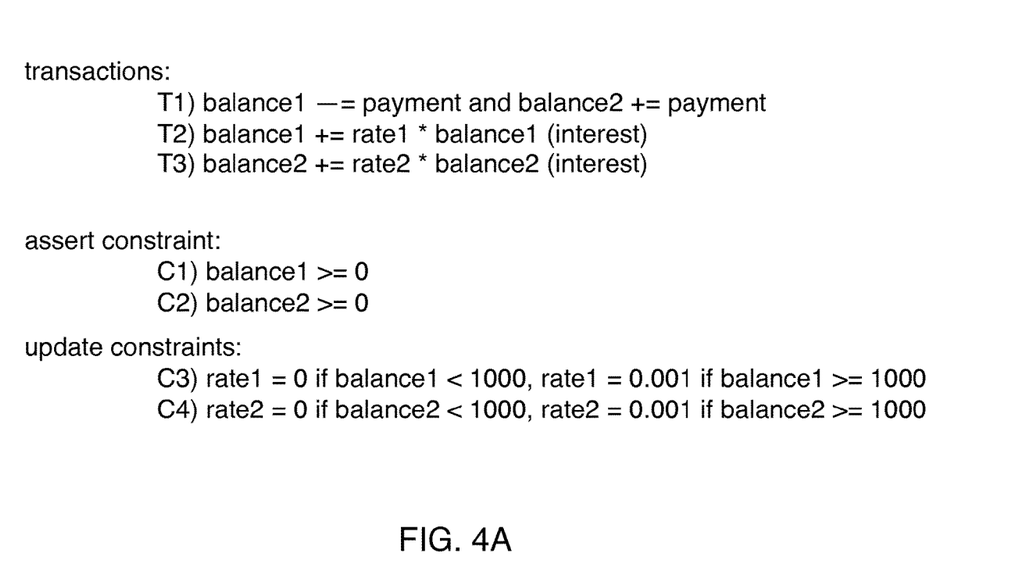
FIG. 4A provides an illustrative example of transactions, assert constraints, and update constraints.
Figure 4B:
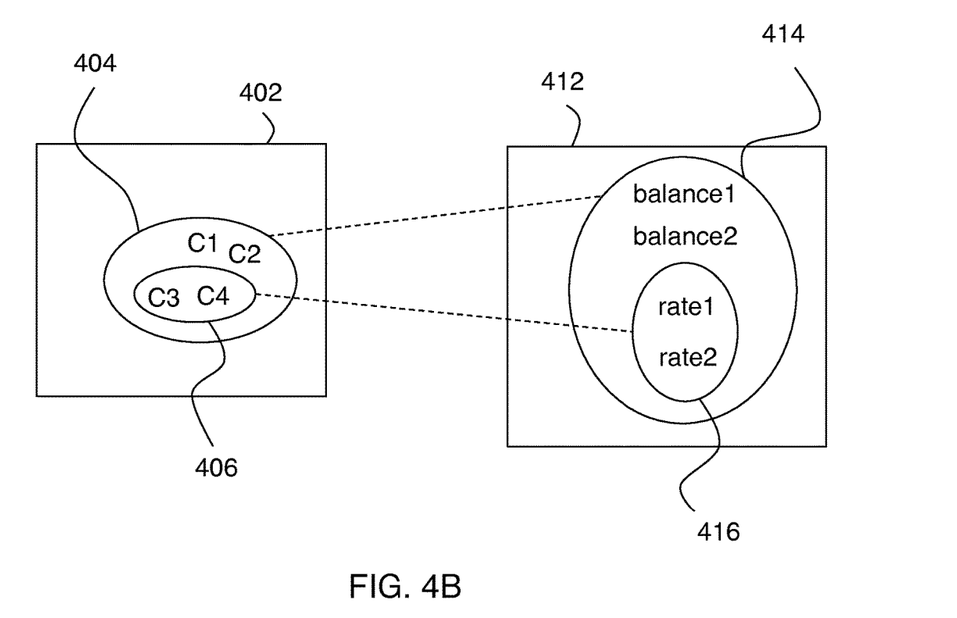
FIG. 4B is a diagram relating to the example of FIG. 4A.

FIGS. 4A-B provide a simple example of the difference between assert constraints and update constraints. On FIG. 4A, three transactions are considered. Transaction T1 is a transfer of funds from account 1 to account 2, transaction T2 is an interest accrual in account 1, and transaction T3 is an interest accrual in account 2. Assert constraints C1 and C2 are to prevent overdrawing accounts 1 and 2 respectively. Update constraints C3 and C4 serve to update the interest rates for accounts 1 and 2 when the balance changes (no interest if the balance is <1000, interest paid if balance >=1000).

FIG. 4B shows Venn diagrams of constraints (left side) and data model members (right side) for the example of FIG. 4A. Here 402 is the set of all constraints, 404 is the set of all constraints that relate to current transaction T1, and 406 is the subset of constraints 404 that are update constraints. On the right side, 412 is the set of all data model members, 414 is the set of all data model members affected by the current transaction T1, and 416 is the set of data model members affected by T1 because of its associated update constraints. It is convenient to refer to data model members that are affected by update constraints of the current transaction as "target members".

In this example, we see that transaction T1 directly affects the data elements balance1 and balance2 (i.e., there is a transfer of funds). However, because of the update constraints, target members rate1 and rate2 are also indirectly affected by committing transaction T1. This can be regarded as a mechanism for checking consistency of second (and higher) order effects of committing the current transaction with the relevant set of constraints. Thus, the commit processing check can include: 1) determining, for the current transaction, target members of the data model that would be updated as a result of update constraints by committing the current transaction; and 2) determining whether committing the current transaction and updating the target members according to the update constraints is consistent with the set of constraints.

In the present work, the determined attribute can be automatically updated and added to the write set before, or as part of, committing the transaction. Thus, the transaction, on commit, automatically ensures this constraint is maintained. The transaction is aborted if there exists an unresolvable write-write conflict, even if one or more of the writes were caused by such a constraint resolution.

In an embodiment, assert and update constraints are specified such that an update constraint cannot cause an assert constraint to be violated. This situation can be realized by having an assert constraint that precludes such a violation. For instance, if variable a1 is determined by an update constraint as in the earlier example and a1 is constrained to be less than 100 by an assert constraint a1<100, this assert constraint is replaced by the assert constraint a0<99, so the update constraint never causes an assert violation.

In an embodiment, a transaction is committed independent of conflicting writes to a determined attribute by the associated update constraint when the update constraint is (re)evaluated at commit time using the merged snapshot. This is warranted because the determined attribute is determined by the constraint and the merged snapshot, not directly by the actions of any transaction.

In an embodiment, the constraints specified for the data model are translated into a collection of single-trigger constraints, e.g., as specified in OTS-102, as part of compilation and instantiation of the data model. Thus, when an update is performed by a transaction and applied to the data model, the imperative procedure associated with each triggered constraint is invoked, and any writes performed by these constraints are tracked as part of the transaction. In particular, the concurrent updates are logically applied to the current snapshot, which means these updates can also cause triggering of update constraints, but all these constraints are then evaluated with the currently committed state plus that to be committed as part of the current transaction, ensuring the constraint holds in the final (to-be-committed) state. As indicated above, in practice it is usually preferable to defer all modification of the current snapshot until the commit processing of the current transaction (as opposed to updating snapshots after each concurrent update). If a concurrent updates affects an update constraint, that update constraint processing can be retriggered by merging this concurrent update during the commit processing of the current transaction.

A write by a constraint-handling procedure can trigger other constraints, which can trigger further writes. It is the responsibility of the application programmer in developing the constraint specification to ensure that this sequence eventually completes. In practice, the sequence is normally short, such as one or two levels of triggering.

In the case of a failure as part of the constraint processing, the transaction is aborted and the changes to the data model are undone.

In a distributed embodiment, the data model instantiation can be executed as a separate "sysdb" process from the processes executing code to perform the actions of the transactions, the latter processes referred to as "agents". When such an agent completes the transaction execution, it communicates this fact to the sysdb process which then handles the commit processing. If the entire data model is maintained by a single sysdb process, it can perform the commit processing of all the constraints as a local action, thus making it efficient compared to a design requiring distributed communication.

In an embodiment in which the data model is partitioned across multiple sysdb processes, it is possible that a constraint-generated write applies to state stored in a sysdb process that is not, heretofore, involved in this transaction. In this case, the current transaction is expanded to include this additional sysdb process.

In an embodiment, the sysdb process logs the changes of the transaction to the data model (i.e. a redo or write-ahead log) and has not actually applied these changes to the data model instantiation. During the initial prepare-to-commit, it then applies these logged changes to the data model instantiation causing the constraints to generate additional writes. These additional writes are captured by a logging mechanism that detects changes to the data model for persisting these changes to secondary storage and/or communicating these changes to other copies of the data model, such as a backup copy provided by a separate process (provided to allow fast recovery in the case of failure). Applying these logged changes can also invoke code to check any affected assert constraints. If any of these assert constraints fail, the transaction can then be aborted.

Note that in this embodiment, the state in this sysdb process during the application of these logged changes represents the merged snapshot up to this point in the log. If an assert constraint is affected by multiple changes in the log, the last such change provides the fully merged snapshot state relative to said assert constraint. Thus, the assert constraint is always evaluated effectively on the final merged snapshot of the state for the current transaction.

After this constraint execution has completed, if the transaction is still able to commit (i.e. there have been no failures as a result of the constraint checks or actions), the transaction state is committed in the conventional way, typically flushing the updates out to a redo log with an indication of transaction commit. If the transaction is forced to abort during commit processing, the changes to the sysdb state can be undone from an undo log, as is well-established in the art.

In the case that a write-write conflict is detected as part of this commit processing, the commit processing attempts to resolve the write-write conflict, as described below, and otherwise aborts the transaction if it cannot resolve the write-write conflict.

Write-Write Conflict Resolution

In an embodiment, metadata is available at commit time regarding the attributes in the data model that have been updated by this transaction, describing the category, type and or semantics of these attributes. Then, on a write-write conflict, the transaction commit mechanism examines the associated attributes, attribute values and the associated metadata to determine if there is a possible resolution.

As one case, the metadata may indicate that attribute ai, on which there is a write-write conflict between the current transaction and a concurrent transaction, is a counter. In such a case, the commit processing can determine the increment to use from the current transaction. The commit processing for the current transaction can then apply this increment to the value of ai already committed by the concurrent transaction to determine a correct final value for ai. In essence, both the previous committed write and the current transaction are incrementing the counter, so the write-write conflict need not abort the current transaction provided it commits with a value that preserves both increments. If multiple concurrent transactions have updated the counter ai, the commit processing for the current transaction applies the current transaction increment to the most recently committed concurrent update.

For example, if the counter has a previous value of 3 in the original snapshot for the current transaction and now it is 4, the current transaction has incremented it by 1. Then, if the currently committed value of the counter is 7 because of concurrent increments, the current transaction commits with a value of 7+1=8, so the effect of the current transaction, namely an increment by 1 is merged with the effects of the other concurrent updates.

As another case, if an attribute is not a counter, if the concurrent write and the current transaction write are writing the attribute to the same value, the write-write conflict can be considered resolved without further action.

As yet another case, if the metadata indicates that the write-write conflict is arising on a map data structure with a defined default or null value, the commit processing can determine if the concurrent write changes the entry to the default value, indicating it was effectively deleting the entry from the map, whereas the current transaction is writing the same entry to a non-null value. In this case, the value written by the current transaction can override that of the committed value, given the earlier committing transaction effectively deleted an entry and the current one added an entry with the same key, but a different value.

In some cases, the key for the entry is a generated or allocated value so that the current transaction can simply select a different key for an entry that does not conflict with concurrent updates, and thereby resolve the write-write conflict.

Another case is a concurrent transaction writing an element to the tail of the same queue as the current transaction does. This case can be resolved by simply appending the current transaction's element after the element(s) enqueued by the concurrent transaction(s).

In an embodiment, an attribute may have a write conflict resolution procedure associated with it that can do one of the processing sequences indicated above or alternatively some application-specific processing that resolves the write-write conflict. As an illustrative example of the latter, the procedure may determine that a write-write conflict arose as a result of the concurrent transaction allocating some shared resource yet this concurrent transaction represents a lower priority process or user. In this case, the resource can be reclaimed from this lower priority process, possibly running a compensating transaction as a result, and this write-write conflict is then removed as a reason to not allow the current transaction to commit.

Overall, a constraint may cause writes that conflict with a concurrent transaction yet can be resolved by the commit processing based on metadata associated with the affected attribute. A counter can be handled as above with a suitable constraint, i.e. the counter is constrained to be equal to the number of some particular event. As another example, an attribute containing the average value of those in a collection can be affected and thus written by two concurrent transactions that update values in this collection. However, by recomputing the average in the current transaction with the previously committed values, the revised value eliminates the need for its original write-write conflict to cause an abort of the current transaction.

Considering the general structure of applications, an application data model is commonly comprised of both raw data input and (internally) derived data. The raw data input is normally sourced from specific input devices, so does not itself lead to write-write conflicts. For example, the raw data input from sensor 1 does not overwrite that raw data input from sensor 2. Moreover, there is one process responsible for reading from sensor 1, so updates from sensor 1 are inherently sequential and are not concurrent with each other.

In contrast, the derivative data can often be specified in terms of equality constraints (or similar constructs) that determine the values of the derived data. Thus, two concurrent updates of raw data (e.g., from sensors 1 and 2) can cause write-write conflicts on the derived data, such as the sum above, and these write-write conflicts can be resolved by allowing the recomputation of the constraint based on the merged snapshot.

Using these techniques, write-write conflicts can be resolved in many, if not all cases, in an application, significantly reducing the abort rate, and thereby providing better performance than a conventional realization of fully serializable execution.

Asynchronous Constraints

In an embodiment, an update constraint can be designated as being asynchronous by tagging the determined attribute. For example, the previous constraint could be specified as:

$$a1'next = a0 + 1;$$

to indicate that the update to a1 can take place asynchronously with respect to the update to a0. In this case, if a1 is maintained by a separate sysdb process, the commit processing on the original sysdb process initiates a separate "compensating" transaction to execute on the sysdb process maintaining a1, rather than treating it as part of the current transaction. Consequently, the current transaction does not need to be expanded to include this update. Nor does it need to wait for this update to a1 to be completed.

In the case that the compensating transaction is not able to commit, there can be a further action specified for this case, which can include a further compensating transaction to revert the change to a0. However, in most applications, if a simple write such as to a1 cannot be performed, the system has suffered a fatal problem and cannot continue execution.

A key issue for performance is careful partitioning of the data model across multiple sysdb processes when this is required, and specifying constraints such that when there are cross-partition constraints, they are specified as asynchronous if feasible.

Application logic dealing with asynchronous equality constraints cannot assume that the constraint strictly holds. However, the logic can often rely on a weaker form of constraint semantics. For instance, if, in the above example, a0 is a value that is slowly changing, then a1 can be expected to be close to the proper value, even if not exactly correct. This is because the compensating transaction to update a1 is normally performed shortly after any update to a0.

Similarly, in the case of an equality constraint between collections, if the determining collection is again changing relatively slowly, the determined collection may be sufficiently close to use. For example, if the application logic is iterating over the determined collection to compute some statistics, having an approximately accurate collection may be adequate for the purposes of this statistics computation.

Finally, some application logic may only be dealing with state on the second sysdb, and thus encounter no issue of strict consistency between the two partitions of the state despite their asynchronous update behavior.

Relaxed Assert Constraints

In practice, real-world constraints are often more relaxed than those conventionally stated for sequential execution. For instance, with a classic order-inventory system, one might cite that the number of items allowed to be ordered should not exceed those in the inventory. However, in reality, the real concern is avoiding disappointing customers unnecessarily and incurring business costs for refunding orders. Moreover, the actual inventory that is available and suitable to ship is not precisely known in the data model, given breakage, pilfering and data capture errors. Thus, the actual computer-stored value is at best, a good estimate of the number of items available for orders. On this basis, the constraint can be made more approximate.

In one embodiment, a constraint can be specified as approximate by indicating that one or more attributes can use their previous value. For example, the assert constraint of the earlier example can be specified as:

$$30 > b'prev + c;$$

indicating that a transaction updating c can simply use the snapshotted value of b and does not need to check for a concurrent write to attribute b. This relaxed constraint eliminates the need to identify the read-write set associated with this constraint and re-evaluate the constraint.

The definition of the previous value, as specified by the 'prev suffix, is the value of the attribute at the start-time of the current transaction. Thus, it may be the current value as well if this attribute was not updated concurrently with the current transaction.

Application logic can use the relaxed semantics by effectively being able to assume that an assert constraint is approximately true. In some cases, this approximation can be tightly estimated. For example, considering a bank overdraft situation, if the amount someone can withdraw within a given time interval is limited to say D dollars, the assertion of the account not being overdrawn is correct within D dollars, assuming transactions complete in a relatively short period of time compared to one day.

In an embodiment using the real time clock for the start and commit times, an application can also know the time interval between the snapshot value of an attribute (i.e. taken at the start time), and the current time. This known interval can also allow an application to bound inaccuracy of the assert constraint expression.

By providing a means to specify relaxed assert constraints, the constraint-based consistency of this invention can be provided with greater efficiency than if all constraints are specified without allowing these relaxed semantics. This is particularly true for the case of constraints that can span data model partition boundaries, because then, the relaxed semantics can avoid performing a distributed transaction with its associated round-trip communication message costs and delays.

Round-Based Implementation of Transactions

Rather than each agent individually committing transactions, an alternative structure is to tie transaction commit of every agent to a system-wide round completion, indicated by a (round) clock. A round is synchronized across the application such that an agent does not start processing round i until it has received all the updates relevant to it from other agents executing their round i−1. Normally, this is accomplished by not allowing any agent to proceed to round i until all agents have indicated their completion of round i−1. In effect, each new round message from the clock indicates the start of a new transaction by the agent, also acting to ensure it has received the state updates from the previous round. The agent then completes the round processing and responds to the clock, to effectively commit the transaction. If an agent has no update to perform during a given round, it effectively commits a null transaction. This incurs relatively low overhead.

Figure 5:
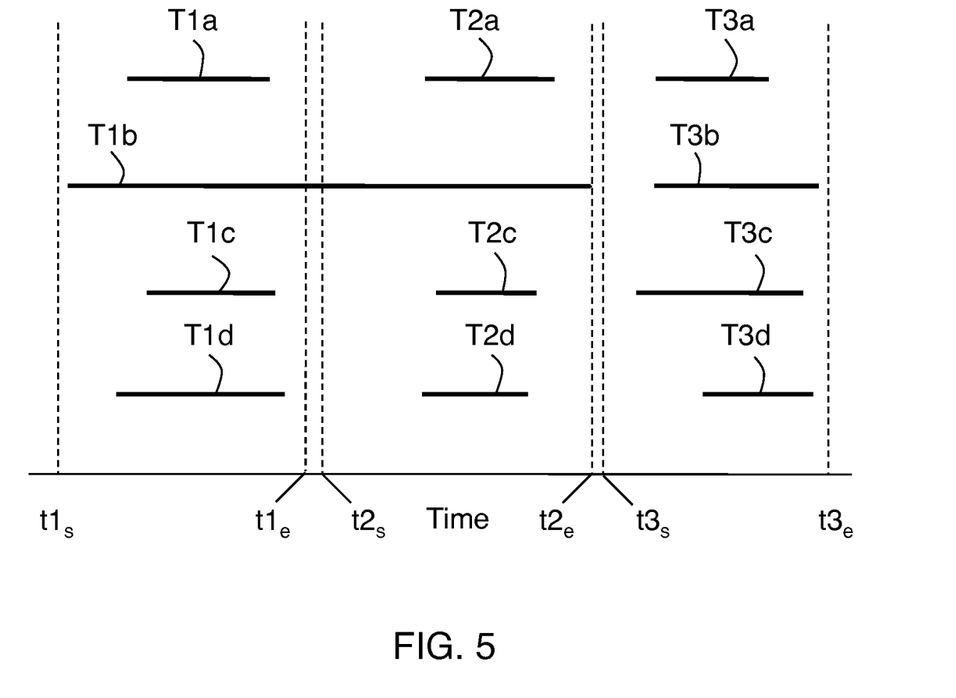
FIG. 5 shows an example of performing transaction processing in rounds.

FIG. 5 provides a schematic illustration of transactions organized into rounds. Here, round 1 starts at time $t1_s$ and ends at time $t1_e$, round 2 starts at time $t2_s$ and ends at time $t2_e$, and round 3 starts at time $t3_s$ and ends at time $t3_e$. Agents a, b, c, and d are expected to execute one transaction each round (which may be a null transaction). The transactions are labeled T1a for the transaction by agent a in round 1, T3d for the transaction by agent d in round 3, etc. A new round usually does not begin until after all agents have completed the previous round (i.e., by committing or aborting their respective transactions). Each agent logically starts its transaction at the beginning of the round. Its actual execution start may be delayed by process scheduling constraints, as shown on FIG. 5. Similarly, each agent's transaction logically completes, i.e. commits, at the end of the round. Its actual execution may complete earlier because it has less to do than the processing available during the round time. Exceptions to this general scheme are possible. For example, transaction T1b on FIG. 5 spans two rounds. Thus, we regard transactions as being organized into rounds if most transactions take place within a single round, with relatively few transactions taking more than one round.

In one embodiment, individual agent (trans)actions can be aborted. In this case, the agent whose actions were aborted receives an indication to that effect, either immediately or at the start of the next round. It is an application-level decision on how the abort of an agent's actions is handled. For instance, in some cases, the agent can just retry the transaction in the following round or take an alternative action. Alternatively, the completion of the current round can be held up until the agent has successfully retried the same transaction. In some cases, this is equivalent to, and can in fact be implemented as, the agent failing and restarting.

In an embodiment, the snapshot behavior can be implemented by blocking updates on receipt at each participating agent once a new round has started, releasing these updates to be provided to the application agent only once the round completes. In the case of an abort, an abort message is sent to each agent, which discards these blocked and queued updates, ensuring these agents do not see the results of round in which the abort occurred. If only the updates generated by the aborting process are discarded, only this aborting process needs to retry its processing for the current round. Otherwise, all processes revert to their state as of the start of the round and redo the processing for the current round.

Alternatively, update messages can be generated as part of reverting the state of the aborting process to the start of the round that effectively reverts the state to undo the changes generating by this aborting process, with the subsequent retry of this processing generating update messages that provide the result of the retry processing.

As another alternative, the transaction mechanism can rely on the new messages generated by the aborting and retrying process that provide updates to the state to provide the correct net state result in the blocking and queued messages of each receiving process before these messages are unblocked and processed in the agent for the next round. For instance, if the first aborted processing sets a variable "foo" to 3 and the subsequent retry sets the variable "foo" to 4, the blocked and queued messages contain one setting "foo" to 3 followed by one setting "foo" to 4, so the net result in the state of the agent is the correct value, namely 4 in this case.

The failure of a process during a round can be handled by restarting the process, having it recover its state as of the start of the round and redo the processing of the round. In this case, the failure is transparent to the transaction round processing except possibly for delaying the completion of the round.

With some applications, it may be feasible to allow the completion of a round even if one or more of the specified processes have not completed their processing and responded to the round clock. For example, the round mechanism could proceed if a specified process has indicated completion of processing within one of the last 3 rounds. Such a process can encounter a concurrent update by another process that committed its transaction in an intervening round. For example, transaction T1$b$ on FIG. 5 would need to consider concurrent updates from transactions T1$a$, T1$c$ and T1$d$.

With some applications, the processing of a specific process can be allowed to execute outside of the round mechanism, based on the changes that such a process makes to the state having no impact on the application correctness. For instance, a temperature sensor process may update the temperature periodically with small differences between consecutive values. The application logic can be designed to operate correctly even if this transpires concurrently with the round-based transactions, i.e. the temperature appears to change in the middle of a round. This can be another source of concurrent updates within a round-based computation.

In an embodiment, there is a provision to indicate special handling of a specific agent process within rounds along the lines of the optimizations described above. For instance, a process can indicate whether the abort of a transaction needs to be retried in the current round or can slip to the next round. This indication can be provided in the action of an agent process registering with the round clock to indicate it is participating in the rounds, i.e. as a parameter in the round registration process. Thus, an embodiment can allow each application process to select different optimizations in handling aborts and failures with the goal of minimizing the impact on application performance of these events while still ensuring application correctness.

In the context of a round-based implementation, the 'next suffix is used to designate that the value is updated in the next round. The 'prev suffix may refer to a concurrently updated value when the current transaction can span multiple rounds. That is, the value could have been updated during one of the intervening rounds.

The round-based approach reduces the cost of the transactions both in terms of messages to initiate and commit transactions, but also the need to specify 'prev constraint values, or conversely, the cost of failing to do so.

The invention claimed is:

1. A system, comprising:
one or more processors configured to:
perform a plurality of transactions, including a current transaction and one or more concurrent transactions;
wherein:
the current transaction has a current start time and a current target commit time, and the one or more concurrent transactions are committed to a data model at corresponding one or more intermediate times after the current start time and before the current target commit time;
perform a commit processing check to determine whether the current transaction can be committed consistently with a set of one or more constraints relating to data in the data model, the commit processing check being based at least in part on: a snapshot corresponding to the current transaction that is a snapshot of at least a part of the data model as of the current start time, and one or more changes to the data model made by the one or more concurrent transactions;
in the event that it is determined that the current transaction can be committed consistently with the set of one or more constraints relating to the data in the data model, commit the current transaction; and
in the event that it is determined that the current transaction cannot be committed consistently with the set of one or more constraints relating to the data in the data model, abort the current transaction; and
one or more memories coupled to the one or more processors, configured to provide the one or more processors with instructions.

2. The system of claim 1, wherein to perform the commit processing check comprises to perform write-write conflict resolution.

3. The system of claim 1, wherein to perform the commit processing check comprises to update the snapshot of the current transaction according to operations performed by the current transaction to provide an updated snapshot.

4. The system of claim 1, wherein to perform the commit processing check includes to update the snapshot of the current transaction according to committed changes made by at least some of the one or more concurrent transactions to provide a merged snapshot.

5. The system of claim 1, wherein to perform the commit processing check includes to:
update the snapshot of the current transaction according to committed changes made by at least some of the one or more concurrent transactions to provide a merged snapshot; and
evaluate one or more assert constraints in the set of one or more constraints using the merged snapshot.

6. The system of claim 1, wherein to perform the commit processing check includes to:
determine, for the current transaction, target members of the data model that would be updated as a result of one or more update constraints in the set of one or more constraints by committing the current transaction;
determine whether committing the current transaction and updating the target members according to the one or more update constraints would be consistent with the set of one or more constraints.

7. The system of claim 1, wherein a common clock is used to organize some or all of the transactions in rounds.

8. The system of claim 1, wherein the set of one or more constraints include one or more of: assert constraints, update constraints, asynchronous constraints, and/or relaxed assert constraints.

9. The system of claim 1, wherein the set of one or more constraints is sufficient to ensure correct behavior of a concurrent transaction application program.

10. The system of claim 1, wherein to perform the commit processing check includes to execute user-supplied code for checking the set of one or more constraints.

11. The system of claim 1, wherein to perform the commit processing check comprises to execute automatically generated constraint check code for checking the set of one or more constraints.

12. The system of claim 11, wherein the automatically generated constraint check code is generated from the set of one or more constraints.

13. A method, comprising:
performing, using one or more processors of a computer, a plurality of transactions, including a current transaction and one or more concurrent transactions; wherein:
the current transaction has a current start time and a current target commit time, and the one or more concurrent transactions are committed to a data model at corresponding one or more intermediate times after the current start time and before the current target commit time;
performing a commit processing check to determine whether the current transaction can be committed to a memory of the computer consistently with a set of one or more constraints relating to data in the data model, the commit processing check being based at least in part on: a snapshot corresponding to the current transaction that is a snapshot of at least a part of the data model as of the current start time, and one or more changes to the data model made by the one or more concurrent transactions;
in the event that it is determined that the current transaction can be committed consistently with the set of one or more constraints relating to the data in the data model, committing the current transaction; and
in the event that it is determined that the current transaction cannot be committed consistently with the set of one or more constraints relating to the data in the data model, aborting the current transaction.

14. The method of claim 13, wherein the commit processing check comprises to perform write-write conflict resolution.

15. The method of claim 13, wherein the commit processing check comprises to update the snapshot of the current transaction according to operations performed by the current transaction to provide an updated snapshot.

16. The method of claim 13, wherein to perform the commit processing check includes to update the snapshot of the current transaction according to committed changes made by at least some of the one or more concurrent transactions to provide a merged snapshot.

17. The method of claim 13, wherein to perform the commit processing check includes to:
update the snapshot of the current transaction according to committed changes made by at least some of the one or more concurrent transactions to provide a merged snapshot; and
evaluate one or more assert constraints in the set of one or more constraints using the merged snapshot.

18. The method of claim 13, wherein to perform the commit processing check includes to:
determine, for the current transaction, target members of the data model that would be updated as a result of one or more update constraints in the set of one or more constraints by committing the current transaction;
determine whether committing the current transaction and updating the target members according to the one or more update constraints would be consistent with the set of one or more constraints.

19. The method of claim 13, wherein a common clock is used to organize some or all of the transactions in rounds.

20. The method of claim 13, wherein the set of one or more constraints include one or more of: assert constraints, update constraints, asynchronous constraints, and/or relaxed assert constraints.

21. The method of claim 13, wherein the set of one or more constraints is sufficient to ensure correct behavior of a concurrent transaction application program.

22. The method of claim 13, wherein to perform the commit processing check includes to execute user-supplied code for checking the set of one or more constraints.

23. The method of claim 13, wherein to perform the commit processing check comprises to execute automatically generated constraint check code that checks the set of one or more constraints.

24. The method of claim 13, wherein the automatically generated constraint check code is generated from the set of one or more constraints.

25. A computer program product embodied in a tangible computer readable storage medium and comprising computer instructions for:
performing a plurality of transactions, including a current transaction and one or more concurrent transactions; wherein:
the current transaction has a current start time and a current target commit time, and the one or more concurrent transactions are committed to a data model at corresponding one or more intermediate times after the current start time and before the current target commit time;
performing a commit processing check to determine whether the current transaction can be committed consistently with a set of one or more constraints relating to data in the data model, the commit processing check being based at least in part on: a snapshot corresponding to the current transaction that is a snapshot of at least a part of the data model as of the current start time, and one or more changes to the data model made by the one or more concurrent transactions;

in the event that it is determined that the current transaction can be committed consistently with the set of one or more constraints relating to the data in the data model, committing the current transaction; and in the event that it is determined that the current transaction cannot be committed consistently with the set of one or more constraints relating to the data in the data model, aborting the current transaction.

\* \* \* \* \*

UNITED STATES PATENT AND TRADEMARK OFFICE
CERTIFICATE OF CORRECTION

PATENT NO. : 9,805,088 B2
APPLICATION NO. : 15/067737
DATED : October 31, 2017
INVENTOR(S) : David R. Cheriton

Page 1 of 1

It is certified that error appears in the above-identified patent and that said Letters Patent is hereby corrected as shown below:

In the Specification

In Column 1, Line 28, after "desirable", delete "is".

Signed and Sealed this
Twenty-fourth Day of July, 2018

Andrei Iancu
*Director of the United States Patent and Trademark Office*